CANCELED
Patented Sept. 29, 1936

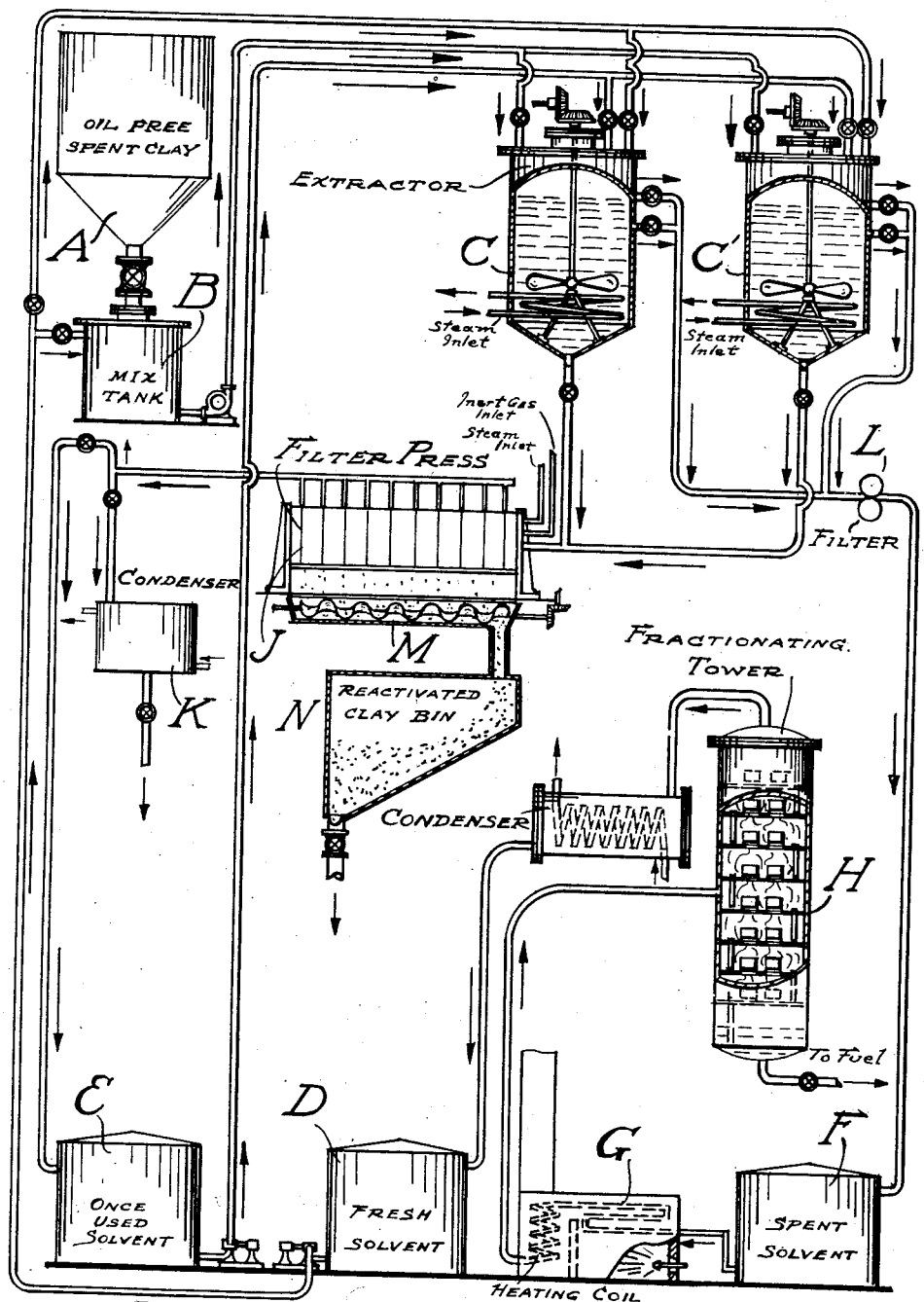

2,055,616

UNITED STATES PATENT OFFICE 2,055,616

PROCESS OF REVIVIFYING SPENT ADSORBENT CLAYS

John V. Starr, Cranford, N. J., assignor to Standard-I. G. Company

Application October 1, 1934, Serial No. 746,332

4 Claims. (Cl. 252—2)

This invention relates to a process of revivifying spent adsorbent clays and will be fully understood from the following description when read in conjunction with the drawing, the sole figure of which is a diagrammatic representation, partly in section, of an apparatus appropriate for carrying out the invention.

Adsorbent clays have been used in various refining processes, such as, for example, in treating lubricating oil stocks or waxes to improve their color or for treating naphthas for decolorization, stabilization and the removal of gum. In the various clay treating processes, the spent clay is removed by settling or by various mechanical means, such as, filter pressing, etc. It is important to recover the clay and to revivify the same so as to make it again active and use it for the treatment of further amounts of oil or wax. The clay may be of the variety known as fuller's earth, Attapulgus clay, Utah clay, chemically activated clay, etc. It may be used for the treatment of the oils in finely ground form or in the form of a coarse clay. The following revivification process may be applied to both types of clay, although its greatest advantages are obtained when used for revivifying spent finely divided clay.

The spent clay such as press cake is first freed from the oil by washing with naphtha or steaming or by blowing with steam or inert gas. When subsequent processing operations utilize naphtha, e. g. centrifuging a contacted cylinder oil, this may be used to remove oil from filter cake. On other neutral stocks steaming is to be preferred in order to prevent lowering the flash. On sour oils however, steam should not be used because of serious corrosion troubles; inert gas blowing is preferable. The deoiled spent clay thus obtained contains dark colored bodies and gummy or asphaltic products retained by adsorption. I have found that these colored bodies and other adsorbed constituents are removed from the clay by extraction with a hydroformed solvent or with a mixture of a hydroformed solvent with other organic solvents, leaving the clay highly effective for further use as a treating and decolorizing agent.

The hydroformed solvent to be used in my invention is produced by vapor phase destructive hydrogenation of petroleum distillates boiling below, approximately, 700° F. The range of raw materials comprises naphthas, kerosenes and gas oils. Cracked distillates are advantageously used in the vapor phase destructive hydrogenation but the best hydroformed solvents are obtained by destructively hydrogenating the unsaturated and naphthenic extracts obtained by treating a naphtha or kerosene or gas oil boiling below about 700° F. with a selective solvent, such as, liquid sulfur dioxide, triphenyl-phosphate, tri-ortho-cresyl phosphate, etc. The extracts obtained by treating a kerosene stock with a liquid $SO_2$, according to the Edeleanu process, are probably the best raw materials for destructive hydrogenation to produce hydroformed solvents. The distillates described such as the Edeleanu extract mentioned, are passed in vapor phase with free hydrogen over suitable catalysts at a pressure in excess of 20 atmospheres and, preferably, between 50 to 200 atmospheres and at a temperature above about 900° F. and, preferably, within the range of about 930 to 1050° F. The amount of the hydrogen is about 1000 to 4000 cubic feet per barrel of feed oil. The catalysts comprise oxides or sulfides of the metals of the 6th group of elements with suitable promoters, such as, alkali or alkali earth oxides. The hydrogenated solvent should start to boil at about 122° F. and should not include products boiling much above 500° F. Any higher boiling products are preferably recycled during the destructive hydrogenation. The hydroformed solvent possesses highly desirable solvent properties and its Kauri butanol value is usually higher than about 40. The last mentioned test is carried out according to the method given in Gardner's "Physical and Chemical Examination of Paints, Varnishes and Colors." The following example will illustrate a hydroformed solvent prepared by destructively hydrogenating the oil fraction obtained by extracting a burning oil with liquid sulfur dioxide:—

| | |
|---|---|
| °A. P. I. | 19.7 |
| Initial boiling point | 150° F. |
| Final boiling point | 522° F. |
| Kauri butanol value | 117.3 |

In accordance with my invention the spent clay after removal of adhering oil by washing with naphtha, steaming, etc. is agitated with a quantity of hydroformed solvent to which may be added an aliphatic alcohol, such as methyl, ethyl, isopropyl alcohol, etc., an aliphatic ketone, such as acetone, methyl-ethyl ketone, etc. or other organic solvents, such as pyridine, chloroform, aniline, etc. It is frequently advantageous to carry out the extraction step at an elevated temperature and I have found that temperatures of about 150–160° F. or higher are suitable.

It is possible to apply the countercurrent extraction principle whereby partially spent solvent is used in the first extraction followed by fresh solvent in a second extraction. Or continuous extraction may be used. When substantially complete extraction of the clay has been effected, the solvent and clay slurry is put through a press, the press cake washed with additional solvent, and the filtrate and washed liquor are distilled for the recovery of the solvent. While still in the press the remaining solvent is removed from the cake by steaming, blowing with inert gas or other suitable means. The hydroformed solvent is then separated from the water and if a water soluble component is used, e. g. alcohol it is recovered by distillation. The press cake may then be dumped and reused for treating either as it is or after partial drying, for example, to 15–25% moisture, or in the form of an aqueous slurry.

Referring now to the diagram; A represents a hopper for the spent clay from which the oil has been removed by suitable means; B a mix tank; C and C' extractors fitted with paddle agitator driven by bevel gears, steam coils for maintaining an elevated temperature and side drawoffs from which the supernatant solvent may be decanted either to the once used solvent tank E or to the totally spent solvent tank F; D, E, and F tanks for fresh solvent, once used solvent, and totally spent solvent, respectively; G a fired heating coil; H fractionating tower; J a filter press of the Sweetland type equipped with inert gas and steam lines; K condenser; L a small leaf filter in two sections so that the solvent decanted from the extractor can pass through one section while the other is being cleaned in order to remove small traces of suspended clay; M a trough with screw conveyor in the bottom to carry the press cake to the reactivated clay bin N.

One method of carrying out this invention is as follows: A small amount of fresh solvent from D is pumped into mix tank B at the same time the mix tank is being charged with spent clay from hopper A. This thick slurry is pumped by a centrifugal pump to either extractor. Steam is admitted to the heating coil to maintain an elevated temperature and I have found that a temperature of around 150 to 160° F. is suitable. Partially spent solvent from tank E is then pumped into the extractor and the slurry is agitated with the solvent to extract the color-forming, asphaltic, etc., material which is retained in the spent clay. The time of extraction may be from 1 to 4 hours. The agitator is then stopped and the slurry allowed to settle to some extent leaving a layer of fairly clear solvent above the clay. This is decanted through the side drawoffs through the filter L to the spent solvent tank F. A portion of fresh solvent is then pumped to the extractor, the partially extracted clay agitated at elevated temperature with this batch of solvent as before until extraction is substantially complete. The slurry from the extractor then passes to the filter press J where the partially spent solvent is removed from the clay and goes back to the once used solvent tank E. The press cake is then blown with inert gas and finally with steam. When the steam is turned on the effluent from the press is diverted through a condenser to condense the solvent which has been removed by steaming the press cake and the condensate goes to solvent recovery. The hydro-formed solvent separates from the water and if a water soluble component is present, for example, alcohol, it is recovered by distillation. The press cake is then dumped into trough M and carried by the screw conveyor to reactivated clay storage. In some cases it may be desirable to partially dry this clay before reuse, for example, to a moisture content of 15 to 25%, or depending upon the type of contacting employed it may be desirable to sluice the cake from the press by means of water and then use the reactivated clay in the form of a slurry. During the extraction the character of the spent clay will dictate the amount of solvent which should be used in the extraction. Also it may be desirable to employ more than two extractors counter-currently, in which case the most nearly spent solvent is used in the first extraction and the fresh solvent on the last extraction.

Spent solvent from tank F passes through a fired heating coil G and is flashed into a fractionating tower H, from which the overhead product is condensed and returned to fresh solvent tank D. Bottoms from the fractionating tower H representing the asphaltic dark color oil removed from the clay is diverted to fuel.

The following examples will illustrate my invention:

Pressed distillate from Mid-Continent crude was reduced to a bottoms stock of 550 V/100° F., treated with 5# of 98% sulfuric acid per barrel and the sludge settled. A portion of the acid oil was then decolorized by contact filtration with ¼# per gallon of "Super Filtrol", an acid treated clay, at a temperature of 400° F. The spent clay was washed with naphtha to remove excess oil and then freed of naphtha by blowing with inert gas. The contacted oil showed a color of 7 Tag-Robinson.

The oil free spent clay was then agitated thoroughly with a solvent comprising 50 parts hydro-formed solvent and 50 parts methyl-ethyl ketone in the amount of about 15 cc. solvent per gram of dry clay, at a temperature of 150–160° F., in a vessel fitted with a refluxed condenser. After agitation for about one hour the slurry was pressed on a vacuum filter, the press cake washed with additional solvent, sucked dry and then heated for about 30 minutes at 200° F. The revivified clay was then used in the same amount as before to decolorize another portion of the sour oil. Under the same conditions the reactivated clay gave a color of 5⅛ Tag-Robinson. A curve showing T. R. color vs. # fresh clay per gallon shows that this color (5⅛) would have been obtained with slightly less than $\tfrac{3}{32}$# fresh clay per gallon, hence the efficiency of the reactivated clay was approximately 60% that of the fresh clay. Since a small amount of clay was lost during the reactivation steps (handling losses, etc.) and since the fresh clay if extracted, washed, dried, etc., without spending, has somewhat less efficiency than originally, it is obvious that this is a conservative figure.

As another example, another batch of reduced pressed oil was treated as above and decolorized by contact filtration with ¼# "Super Filtrol" per gallon giving a color of 8½ T. R. The spent clay cake was freed of oil as before and reactivated with a mixture of 65 parts hydro-formed solvent and 35 parts of iso-propyl alcohol. The procedure was essentially the same as before. The reactivated clay was again spent by contacting more sour oil, and again reactivated a number of times with the following results:

| Run | No. reactivations | #Clay/gal. | Color T. R. | Percent efficiency |
| --- | --- | --- | --- | --- |
| 1 | Fresh clay | ¼ | 8½ | 100 |
| 2 | 1 | ¼ | 6¼ | 65 |
| 3 | 2 | ¼ | 6¼ | 60 |
| 4 | 3 | ¼ | 6¼ | 55 |

On the basis of the quantity of fresh clay required to give the colors obtained by the reactivated clay, the efficiency of the latter after three reactivations (used four times) was 55%. Again some small handling loss, and the initial loss in efficiency due to the reactivating process even on unused clay, caused a considerable ini-

CANCELED tial drop. Further reactivations gave decreasing efficiencies in the reactivated clays.

My invention may be modified in various ways and should, therefore, not be limited by the examples given for illustration but only by the following claims in which it is my intention to claim all novelty inherent in the invention.

What I claim is:

1. Process of revivifying spent clay which comprises extracting the spent clay with the hydroformed solvent comprising a mixture of hydrocarbons prepared by vapor phase destructive hydrogenation of petroleum distillates.

2. Process of revivifying spent clay which comprises extracting the spent clay with the hydroformed solvent comprising a mixture of hydrocarbons obtained by destructively hydrogenating in the presence of a catalyst an extract of kerosene stock with liquid sulfur dioxide.

3. Process according to claim 1 in which an aliphatic alcohol is added to the hydroformed solvent.

4. Process according to claim 1 in which an aliphatic ketone is added to the hydroformed solvent.

JOHN V. STARR.